(12) United States Patent
Papadopoulos

(10) Patent No.: US 8,716,680 B2
(45) Date of Patent: May 6, 2014

(54) SYSTEM AND METHOD FOR REDUCING TRAPPED ENERGETIC PROTON OR ENERGETIC ELECTRON FLUX AT LOW EARTH ORBITS

(71) Applicant: BAE Systems Information and Electronic Systems Integration Inc., Nashua, NH (US)

(72) Inventor: Konstantinos Papadopoulos, Chevy Chase, MD (US)

(73) Assignee: BAE Systems Information and Electronic Systems Integration Inc., Nashua, NH (US)

(\*) Notice: Subject to any disclaimer, the term of this patent is extended or adjusted under 35 U.S.C. 154(b) by 128 days.

(21) Appl. No.: 13/780,363

(22) Filed: Feb. 28, 2013

(65) Prior Publication Data

US 2013/0181145 A1 Jul. 18, 2013

Related U.S. Application Data

(63) Continuation-in-part of application No. 13/409,340, filed on Mar. 1, 2012.

(60) Provisional application No. 61/448,480, filed on Mar. 2, 2011.

(51) Int. Cl.
*B01J 19/12* (2006.01)
*G21K 5/00* (2006.01)

(52) U.S. Cl.
USPC ............... 250/492.1; 250/203.1; 250/251; 701/13; 342/369; 33/268

(58) Field of Classification Search
USPC ............... 250/492.1, 203.1, 251; 701/13; 342/369; 33/268
See application file for complete search history.

(56) References Cited

U.S. PATENT DOCUMENTS

| | | | |
|---|---|---|---|
| 3,866,231 A | 2/1975 | Kelly | |
| 4,686,604 A | 8/1987 | Gilman | |
| 4,999,637 A | 3/1991 | Bass | |
| 5,041,834 A | 8/1991 | Koert | |
| 5,053,783 A | 10/1991 | Papadopoulos | |
| 7,197,381 B2 * | 3/2007 | Sheikh et al. | 701/13 |
| 7,268,517 B2 * | 9/2007 | Rahmel et al. | 320/101 |
| 7,627,249 B1 | 12/2009 | Izadpanah | |
| 2012/0223253 A1 * | 9/2012 | Papadopoulos | 250/492.1 |

\* cited by examiner

*Primary Examiner* — Nikita Wells
(74) *Attorney, Agent, or Firm* — Daniel J. Long

(57) ABSTRACT

A system and method for improving the survivability of space systems following a High Altitude Nuclear Explosion (HANE) incident resulting in energetic electrons being trapped in the inner radiation belt of Earth is disclosed. The ULF electromagnetic waves is generated by space or ground based transmitters and the frequency range is selected such that the injected waves are in gyrofrequency resonance with trapped energetic particles. The Radiation Belt Remediation (RBR) depends on the wave-number of the injected waves and the wave-number of the injected waves increases along their propagation path when they approach the cyclotron frequency of the dominant or minority ions $O^+$, $He^+$ and $H^+$.

10 Claims, 12 Drawing Sheets

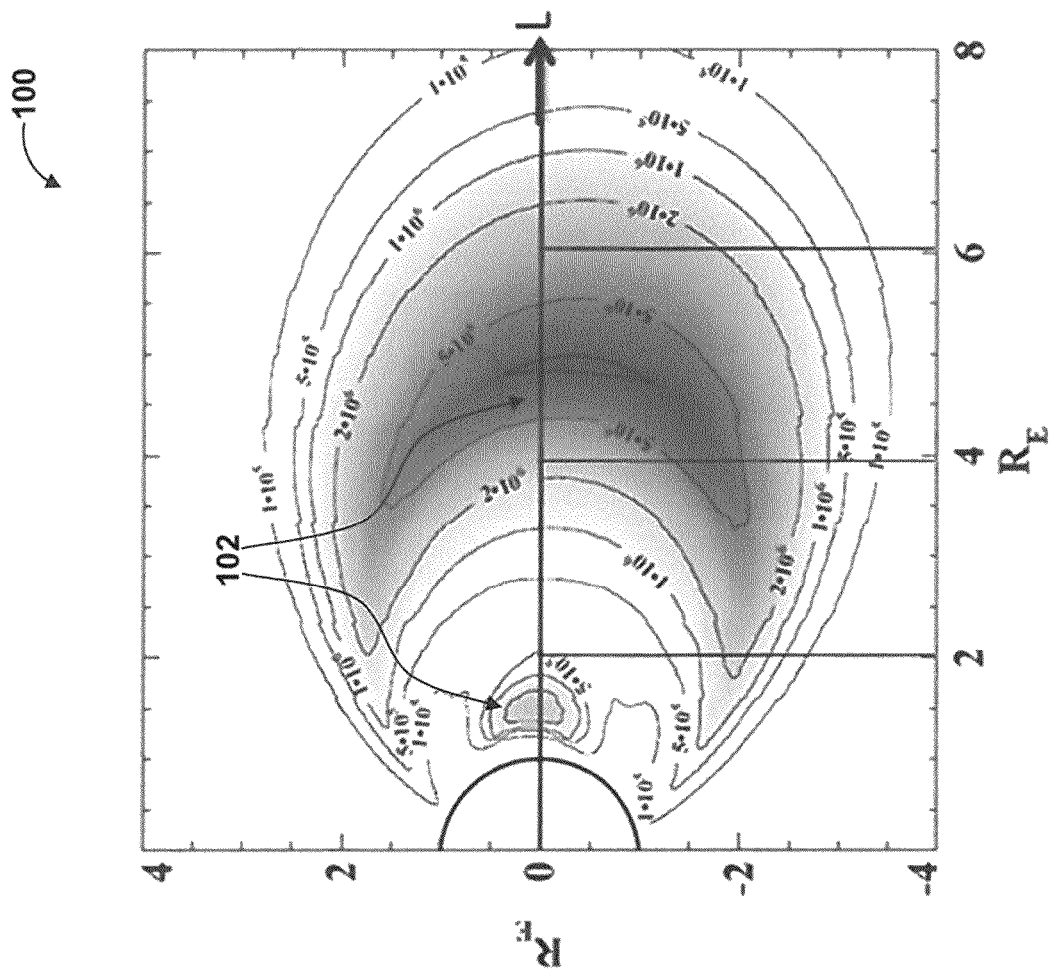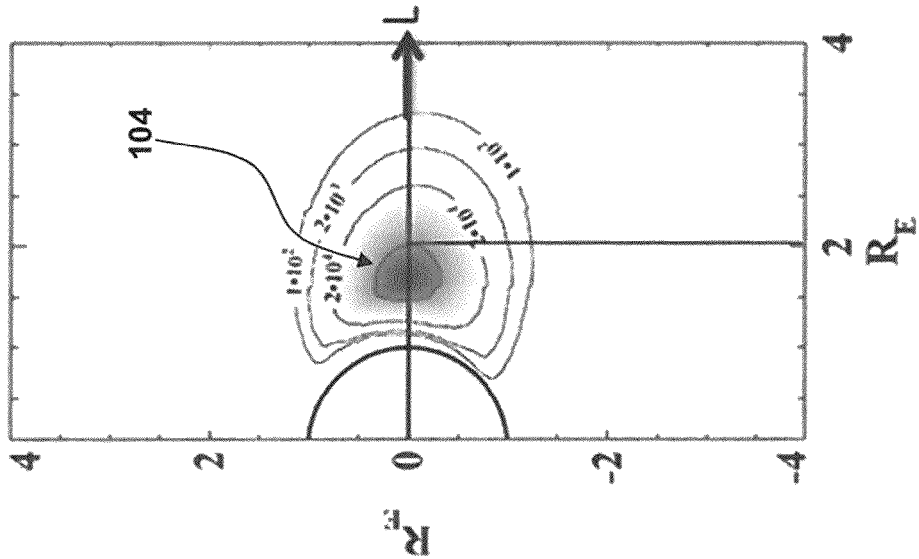
Figure 1

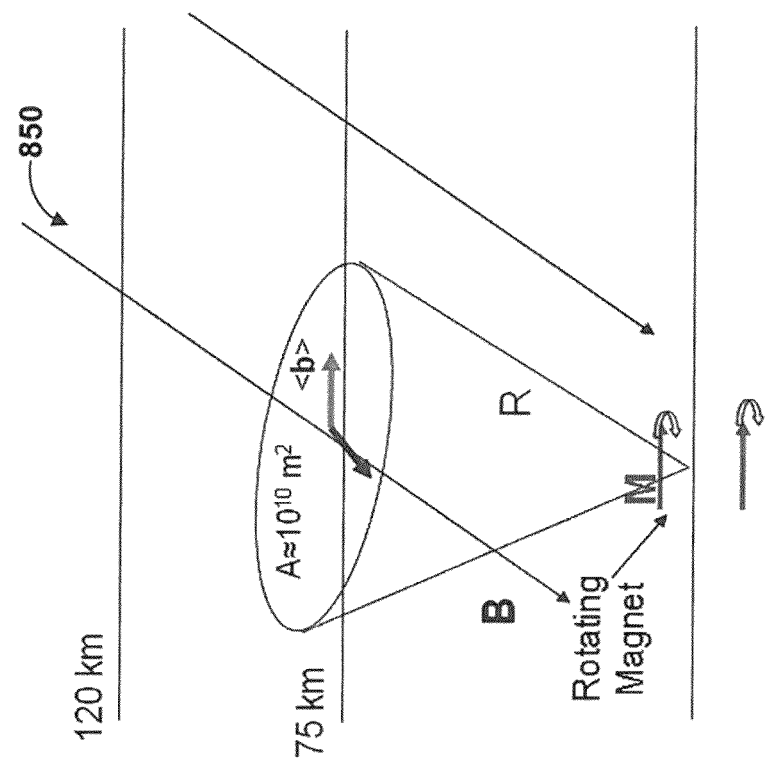
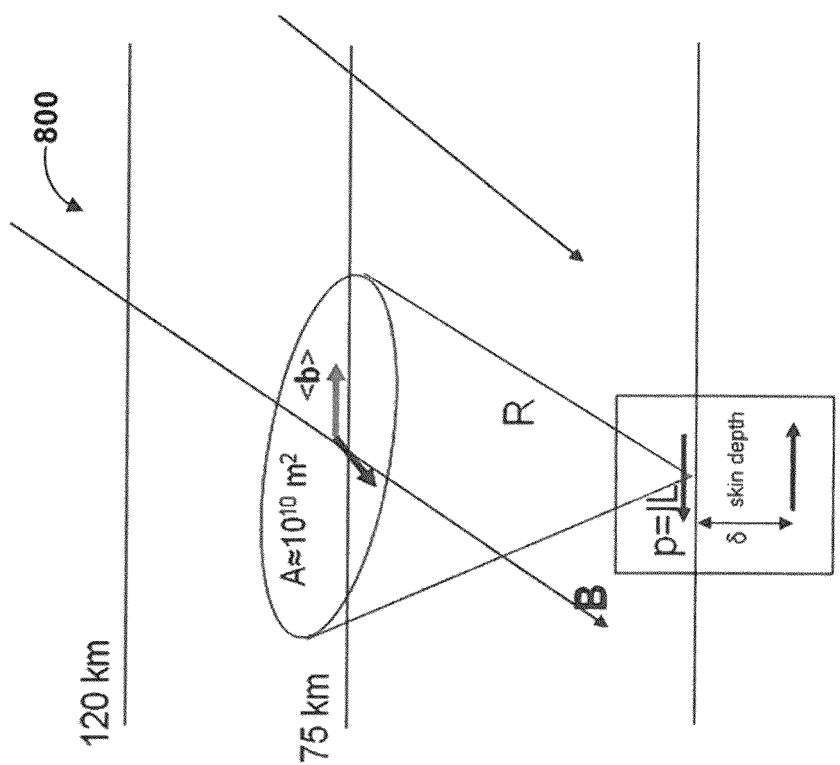
Figure 10a
Figure 10b

SYSTEM AND METHOD FOR REDUCING TRAPPED ENERGETIC PROTON OR ENERGETIC ELECTRON FLUX AT LOW EARTH ORBITS

CROSS-REFERENCE TO RELATED APPLICATIONS

This Application is a Continuation-in-Part of U.S. Application Ser. No. 61/448,480 filed Mar. 2, 2011; and this application claims rights under 35 U.S.C. §119(e) from U.S. application Ser. No. 13/409,340 filed Mar. 1, 2012, the contents of both of which are incorporated herein by reference.

TECHNICAL FIELD

Embodiments are generally related to radiation protection. Embodiments also relate to protecting an electronic component against space environment radiations. Embodiments additionally relate to a system and method for reducing energetic proton flux, trapped in the inner radiation belt by injecting Ultra Low Frequency (ULF) electromagnetic waves. Embodiments additionally relate to a system and method for reducing energetic electron flux enhancements in the gap and inner belt caused by natural solar storms or High Altitude Nuclear Explosions (HANE).

BACKGROUND OF THE INVENTION

The structure and behavior of the energetic electrons and protons trapped in Earth's Radiation Belt (RB) has been the subject of numerous experimental and theoretical studies. Morphologically, two regions are distinguished in the magnetosphere: (i) an inner RB for L shells lower than two and (ii) a gap and an outer RB for L shells higher than two. The inner RB is dominated by protons with energy in excess of 10 MeV and lifetimes from a few years at low altitudes of 400 to 500 km to many tens of years at higher altitudes. Overall the inner belt energetic protons are relatively stable with a typical lifetime of ten years. Contrary to this, the outer RB is very dynamic and dominated by energetic electron fluxes associated with solar events and space weather process. The gap is characterized by low energetic electron flux providing a beneficial environment for the function of satellites.

Earth's inner radiation belt located inside $L=2$ is dominated by a relatively stable flux of trapped protons with energy from a few to over 100 MeV. Radiation effects in spacecraft electronics caused by the inner radiation belt protons are the major cause of performance anomalies and lifetime of Low Earth Orbit satellites. For electronic components with large feature size, of the order of a micron, anomalies occur mainly when crossing the South Atlantic Anomaly (SAA). However, current and future commercial electronic systems are incorporating components with submicron size features. Such systems cannot function in the presence of the trapped 30 to 100 MeV protons, as hardening against such high-energy protons is essentially impractical.

Low Earth Orbiting (LEO) satellites spend a significant part of their orbit in the inner RB that is populated by energetic protons with energy, from one to more than one hundred MeV. The interaction of energetic protons with electronic devices of modern spacecraft results in high rates of anomalies due to Single Event Effects (SEE). Such anomalies range from nuisance effects that require operator intervention to debilitating effects leading to functional or total loss of the spacecraft. A set of operational problems occur when protons deposit enough charge in a small volume of silicon to change the state of memory cell, so that a one becomes zero and vice versa. The memories can become corrupted and lead to erroneous commands. Such soft errors are referred to as Single Event Upsets (SEU) and often generate high background counts to render the sensor unusable. Sometimes a single proton can upset more than one bit giving rise to Multiple Bit Upsets (MBU). Some devices can be triggered into a high current drain, leading to burn-out and hardware failure, known as single event latch-up or burn-out. Other devices suffer dielectric breakdown and rupture.

For LEO satellites, the dominant source of proton influence is the South Atlantic Anomaly (SAA). The SAA is a localized region at a fixed altitude, where protons in the inner RB reach their maximum intensity as a result of the asymmetry of the Earth's magnetic field that can be approximated by a tilted, offset dipole in the inner magnetosphere. At present, satellites with micron size Commercial-Off-The Shelf (COTS) electronics experience serious effects mainly when transiting the SM. For example, the intolerable frequency of SEU of the IBM 603 microprocessors (5 micron CMOS) in Iridium forced Motorola to disable the cache while transiting the SAA. Similar anomalies were experienced by the Hubble Space Telescope and numerous other satellites. To mitigate such effects, spacecraft utilize shielded electronic components that can reduce the flux of protons with energy below few MeV. However, it is very hard to shield against proton fluxes with energy in excess of 20 to 30 MeV.

The severity of the environment is usually expressed as an integral linear energy transfer spectrum, that represents the flux of particles depositing more than a certain amount of energy and charge per unit length of the material. This is referred as Linear Energy Transfer (LET), and given in units of MeV per $g/cm^2$ or per $mg/cm^2$. The effect on devices is characterized as a cross section (effective area presented to a beam), that is a function of the LET. The frequency of SEU caused by energetic protons is a non-linear function of the feature size. For large feature sizes, SEU are due to charge deposition caused by secondary particles with higher LET. For feature sizes smaller than 90 nm, direct proton ionization can cause SEU, resulting in an increase of the frequency of proton SEU by two or more orders of magnitude for deep submicron devices. This could preclude their use even for orbit latitudes different than the SAA. Further hardening the microelectronic components, besides the added weight, is very ineffective for proton energies higher than 20 to 30 MeV. For example, even one inch of Al reduces the 60-80 MeV flux by less than a factor of three. The recent tests have shown that the SEU cross section for energies between 1 to 10 MeV for bulk 65 nm Complementary Metal Oxide Semiconductor (CMOS) technology is by two orders of magnitude higher than for micron size devices, rendering current shielding level inadequate even at low proton energies.

Use of COTS in space applications is dictated by their high volume production and wide-spread, use. The high volume production drives down their recurring component costs because of high yields and economies of scale. The widespread use of COTS reduces the system cost. Furthermore open standards drive down development and life-time support costs reduce the time to market for new products. The SEE issue for submicron CMOS or other electronic components presents a major dilemma, since it will prohibit use of COTS circuits with sub-micron size features and will limit the use of micro-satellites at LEO orbits.

Thus it is difficult to shield against 30 to 100 Mev protons to the level required by sub-micron features of current and future commercial electronic components. Heavy weight penalty must be paid to effect such shielding. Therefore, it is believed that a need exists for an improved system and method for reducing the energetic proton flux trapped in the inner radiation belt. Such system and method should allow the use of commercial electronics with submicron feature size on Low Earth Orbit (LEO) satellites and microsatellites without the operational constraints imposed by the presence of energetic proton fluxes trapped at the inner radiation belts.

Under natural conditions the flux of energetic electrons with MeV energies in the gap is relatively low and does not affect significantly the performance and lifetime of satellites at LEO and MEO orbits. This is not however the case following an accidental or deliberate High Altitude Nuclear Explosion (HANE). Nuclear tests conducted by the US and the USSR in the early sixties indicated that following HANE the flux, of energetic electrons increases by more than a factor of 1000 and remains trapped over times of several years. It is therefore believed that a system that can reduce the flux of energetic electrons injected in the RB following HANE is urgently needed. Such a system will bring the flux of the trapped energetic electrons to their natural level in timescales of order of days or weeks thereby allowing the proper functioning of LEO and (CEO satellites.

BRIEF SUMMARY

The following summary is provided to facilitate an understanding of some of the innovative features unique to the disclosed embodiment and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for radiation protection.

It is another aspect of the disclosed embodiments to provide for protecting an electronic component against space environment radiations.

It is a further aspect of the present invention to provide for a system and method for reducing energetic particle flux trapped in the inner radiation belt and gap by injecting Ultra Low Frequency (ULF) electromagnetic waves.

It is yet another aspect of the present invention to provide for a system and method for reducing energetic electron flux enhancements in the gap and inner belt caused by natural solar storms or High Altitude Nuclear Explosions (HANE).

It is a another aspect of the present invention to provide for a system and method that allows the use of commercial electronics with submicron feature size on Low Earth Orbit (LEO) satellites and microsatellites without the operational constraints imposed by the presence of energetic proton fluxes trapped at the inner radiation belts.

It is a yet another aspect of the present invention to provide for a system and method for reducing energetic proton flux trapped in the inner radiation belt by injecting ULF electromagnetic waves into LEO and selecting ULF frequency range by ensuring that the injected waves are in gyrofrequency resonance with trapped 10 to 100 Mev protons and relativistic MeV electrons. The ULF electromagnetic waves can be generated by space or ground based transmitters.

According to the present invention, the energetic proton flux trapped in the inner radiation belt may be reduced by injecting Ultra-Low Frequency (ULF) electromagnetic waves, generated by space or ground based transmitters. The transmitted ULF frequency range is selected by the requirement that the injected waves are in gyrofrequency resonance with trapped 10 to 100 Mev protons and relativistic MeV electrons Pitch angle scattering of the trapped particles in gyroresonance with the injected waves increases their precipitation rate by forcing their orbits into pitch angles inside the atmospheric loss-cone and are lost by interacting with the dense neutral atmosphere at altitudes below 100 km. Efficient techniques for generating and injecting the required ULF power include Horizontal Electric Dipole (HED) transmitters, Rotating Magnetic Fields (RMF) using arrays of permanent or superconducting magnets and Transient Horizontal Electric Dipole Transmitters (THED). The particle flux reduction can be efficiently accomplished by using ground based arrays of permanent or superconducting magnets rotating at the selected ULF frequencies.

The present invention allow the use of COTS micro-electronic circuits with sub-micron features aboard LEO satellites and micro-satellites, reduce the current shielding weight and increase the useful lifetime of LEO satellites. The invention is based on the recognition that, the rate of SEU and other anomalies of electronic circuits aboard LEO satellites as well as the lifetime limitations are predominantly a function of the trapped proton flux in the 30 to 100 MeV energy range and relativistic MeV electrons. The SEU and electronic circuit anomaly issue will be resolved by providing techniques that will reduce the trapped energetic particle flux encountered by LEO satellites.

The aforementioned aspects and other objectives and advantages can now be achieved as described herein. A system and method for improving the survivability of space systems following a High Altitude Nuclear Explosion (HANE) incident resulting in energetic electrons being trapped in the inner radiation belt of Earth is disclosed. The ULF electromagnetic waves are generated by space or ground based transmitters and the frequency range is selected such that the injected waves are in gyrofrequency resonance with trapped energetic particles. The Radiation Belt Remediation (RBR) depends on the wave-number of the injected waves and the wave-number of the injected waves increases along their propagation path when they approach the cyclotron frequency of the dominant or minority ions $O^+$, $He^+$ and $H^+$.

BRIEF DESCRIPTION OF THE DRAINS

The accompanying figures, in which like reference numerals refer to identical or functionally-similar elements throughout the separate views and which are incorporated in and form a part of the specification, further illustrate the disclosed embodiments and, together with the detailed description of the invention, serve to explain the principles of the disclosed embodiments.

FIG. 1 illustrates a schematic diagram of the proton and electron RB structure as a function of L shell;

FIG. 10a illustrates an apparatus for injecting ULF in the Radiation Belts using Horizontal Electric Dipole (HED), in accordance with the disclosed embodiments;

FIG. 10b illustrates an apparatus for injecting ULF waves in the Radiation Belts using Rotating Magnetic Field (RMF) antennas, in accordance with the disclosed embodiments;

Figure 12:
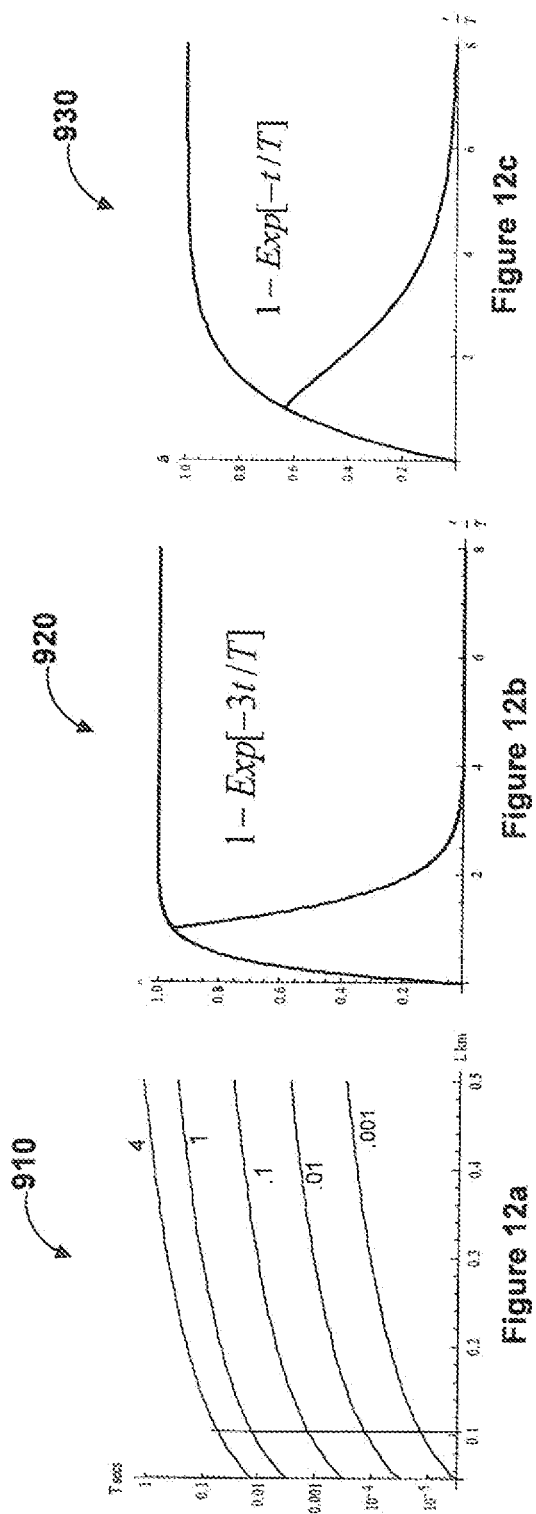
FIG. 12a illustrates a graph showing ground response time as a function of antenna length and ground conductivity, in accordance with the disclosed embodiments.
Figure 13:
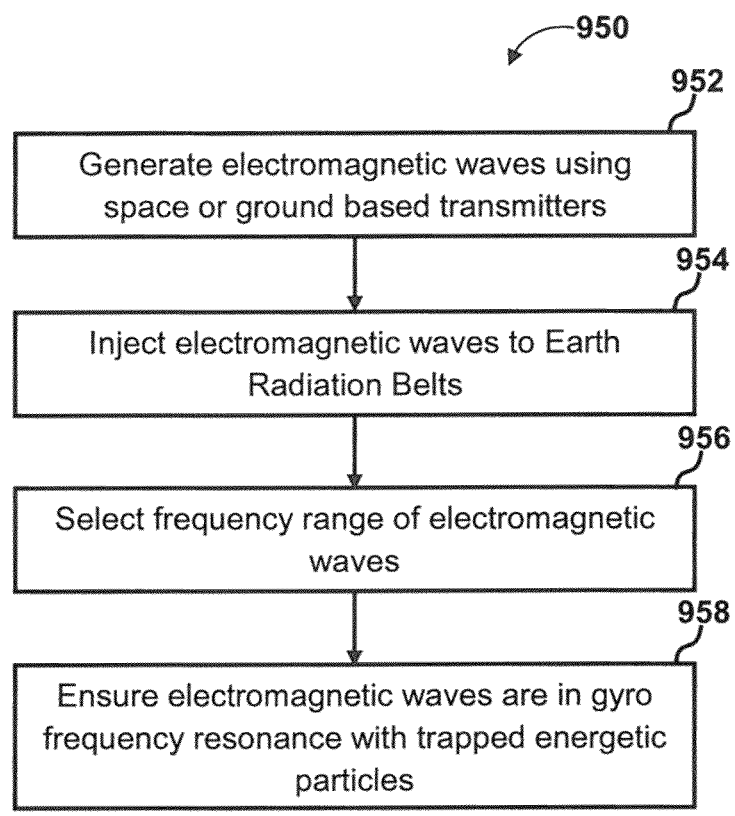

FIG. 12b and FIG. 12c illustrate a graph showing relative efficiency as compared to an HED without reduction by ground return effects for rise times of T/3 and T respectively, in accordance with the disclosed embodiments; and FIG. 13 illustrates a flow chart showing a method for improving the survivability of space systems following a High Altitude Nuclear Explosion (HANE) incident resulting in energetic electrons being trapped in the inner radiation belt of Earth, in accordance with the disclosed embodiments.

DETAILED DESCRIPTION

The particular values and configurations discussed in these non-limiting examples can be varied and are cited merely to illustrate at least one embodiment and are not intended to limit the scope thereof.

1. The Structure of the Radiation Belts

Radiation Belts (RB), also known as Van-Allen belts, are the locus of energetic electron and protons trapped by the Earth's magnetic field. It is customary and convenient to describe a given magnetic field line by its L value. The L value corresponds to the radial location of its intersection with the magnetic equator in units of Earth radius (RE). FIG. 1 illustrates a schematic, diagram of the proton and electron RB structure as a function of L shell. The intensity of a proton radiation belt 104 is confined inside the L=2 value. Contrary to this, the electron radiation belts 102 have two peaks one inside L=2 and another between L=4 and L=5, separated by a gap between L=2 and L=3. It is customary to label regions with L<2 as the inner RB region with 2<L<3 as the gap and regions with L>3 as the outer RB.

Figure 2B:
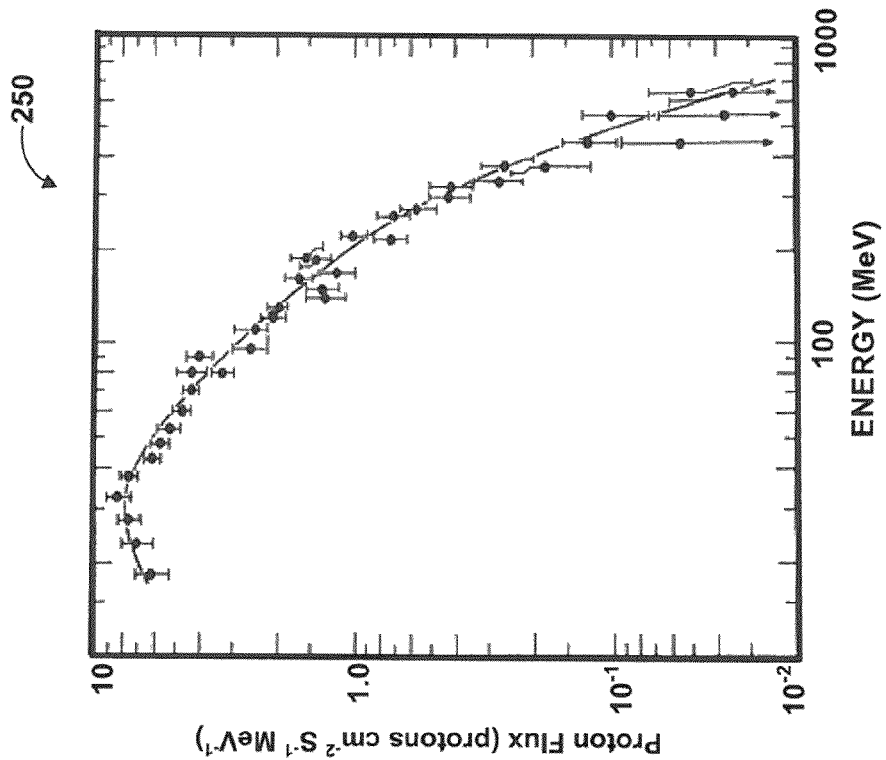
FIG. 2b illustrates a graph showing differential spectrum of inner RB protons.
Figure 2A:
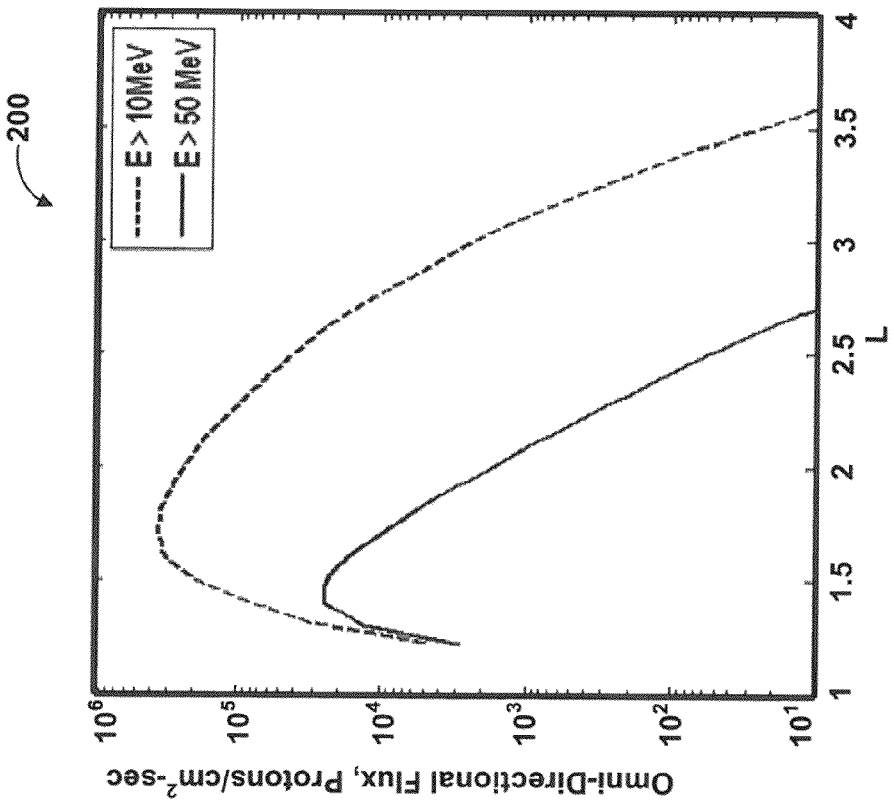
FIG. 2a illustrates a graph showing variation of omni-directional proton flux above 10 MeV and 50 MeV energies as a function of the L value.

The inner RB dominated by the presence of trapped energetic protons is shown in FIG. 1. A more detailed structure of the inner RB proton belt 104 of FIG. 1 is shown in FIGS. 2a and 2b. FIG. 2a illustrates a graph 200 showing variation of omni-directional proton flux above 10 MeV and 50 MeV energies as a function of the L value and FIG. 2b illustrates a graph 250 showing differential spectrum of inner RB protons. Note that for high proton energies, in excess of 20 to 30 MeV the flux peaks at values of L≈1.8 and is marked by an extremely sharp decrease for L>2. Furthermore, the energy spectrum is dominated by energies from 10 to 100 MeV and drops as a power law with energy.

Figure 3B:
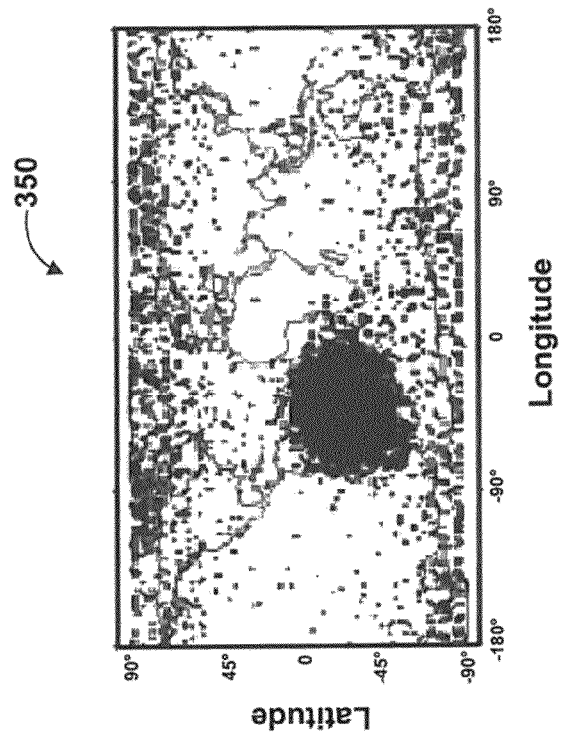
FIG. 3b illustrates a map showing geographical distribution of SEU in nMOS DRAms on UoSAT-2 showing clustering of proton events in the SAA.
Figure 3A:
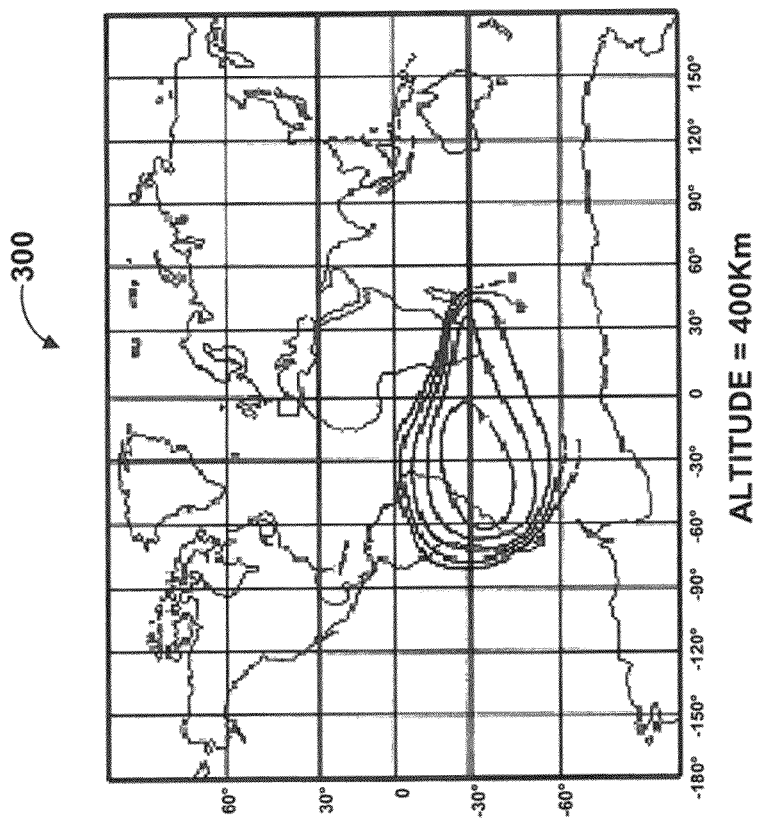
FIG. 3a illustrates a map showing a radiation flux at the SAA at altitude 400 km.

FIG. 3a illustrates a map 300 showing a radiation flux in the SAA at altitude 400 km and FIG. 3b illustrates a map 350 showing a geographical distribution of SEU in nMOS DRAms on UoSAT-2 showing clustering of proton events in the SAA. Note that SAA is a localized region at a fixed altitude where protons in the inner RB protons reach their maximum intensity.

2. Lifetime of Energetic Protons Affecting Satellites at LEO Orbits

Figure 4:
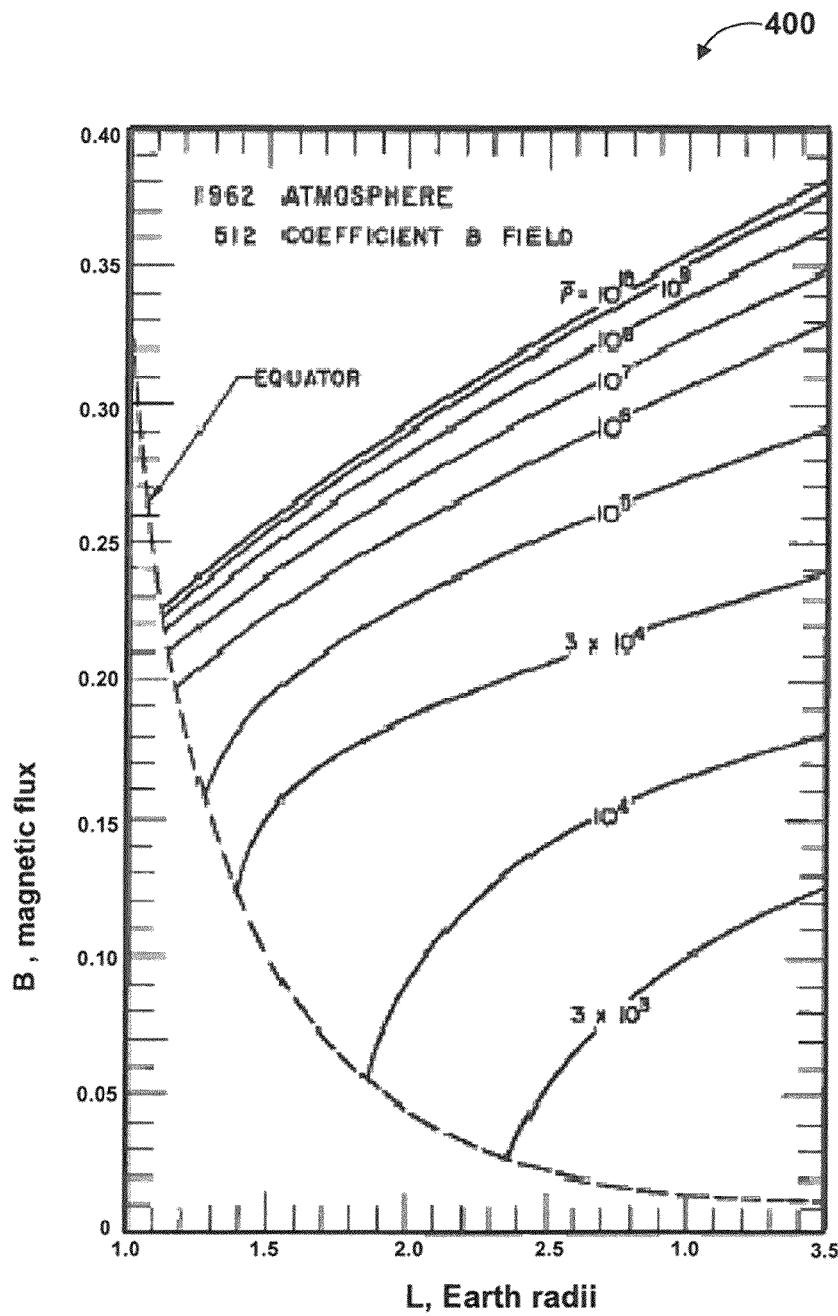
FIG. 4 illustrates a graph showing B-L plot of the mean atmospheric density encountered by the trapped RB particles (atomic electrons/$cm^3$), in accordance with the disclosed embodiments.
Figure 5A:
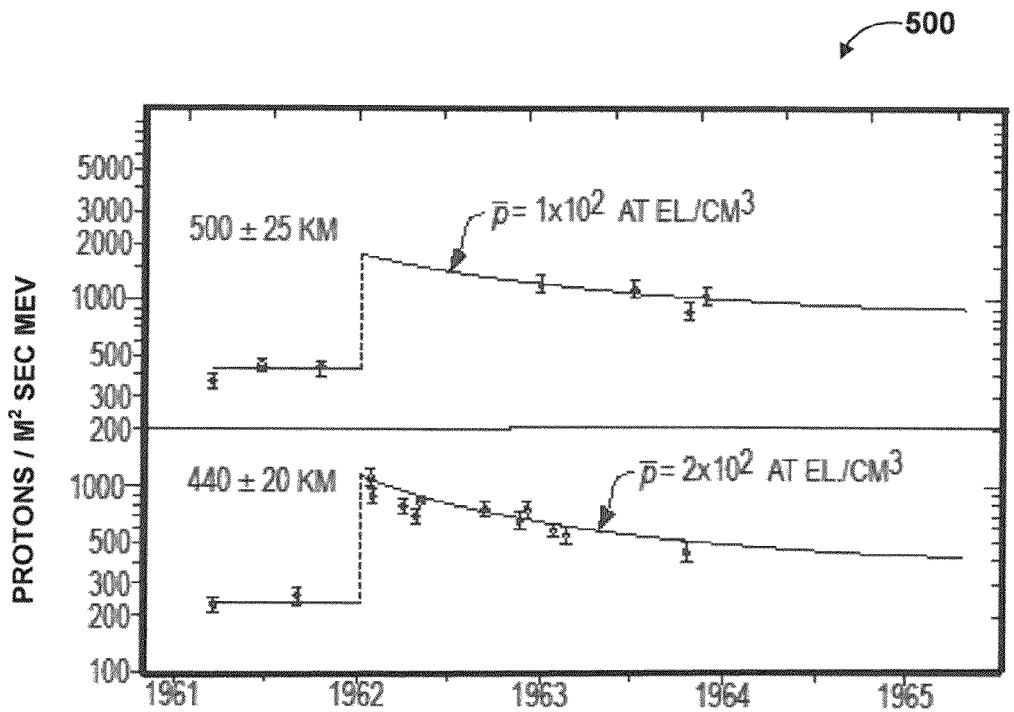
FIGS. 5a and 5b illustrate graphs showing time variation of 55 MeV proton flux and their redistribution caused by the Starfish nuclear test.
Figure 5B:
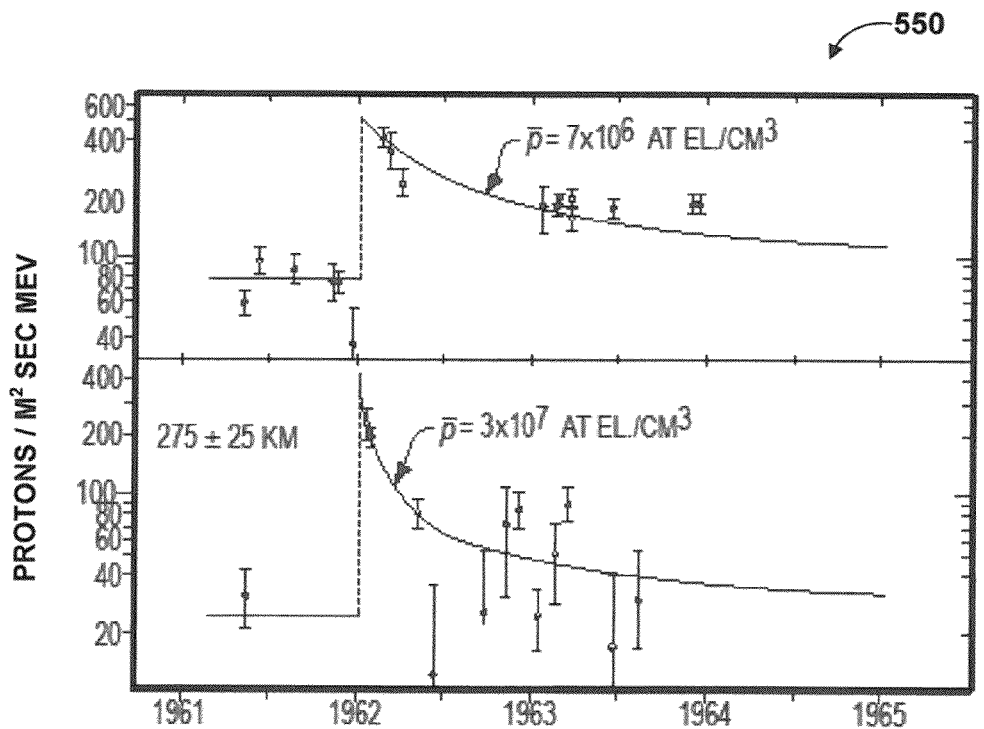

The large gradient of proton flux at the boundary between the inner and outer RB can be explained using the simplified "leaky-bucket" model. According to this model, the average proton flux at a particular L shell and energy is given by balancing the source of the energetic protons, such as Cosmic-Ray Neutron Albedo Decay (CRAND), to their loss to the atmosphere by processes such as inelastic nuclear collisions and slowing down by collisions with atomic oxygen at low altitude. The loss time T of a proton with energy E is controlled by the rate of energy degradation by collisional interactions with atomic oxygen and is given by the approximate formula, $$T \approx 2 \times 10^4 (E/\text{MeV})^{1.3} (\#/\text{cm}^3/<\rho>) \text{years} \qquad \text{Equation 1}$$

where $<\rho>$ is the atomic electron density averaged over a proton orbit. The mean atmospheric density encountered by Re protons (atomic electrons per $\text{cm}^3$) averaged over solar cycle in a B-L map 400 as computed by Cornwall et al. (1965) is shown in FIG. 4, where B is the magnetic field value at the particle mirror point. These results are consistent with particle lifetimes measured following the Starfish nuclear test for fifty five MeV protons trapped at L=1.4 with mirror points between two hundred and twenty and seven thirty kilometer measured by Filz and Coleman [1965] and shown in FIGS. 5a and 5b. Referring to L=1.8 and to the energy range thirty to hundred Mega electron Volt (MeV), the lifetime is from few years to few thousand years. FIGS. 5a and 5b illustrate graphs 500 and 550 showing time variation of fifty five MeV proton flux their redistribution caused by the Starfish test.

The dilemma occurs when similar considerations are applied to the outer RBs and compared with the results as shown in FIG. 2a, based on data provided by the National Space Science Data Center (NSSDC). As seen in the FIG. 2a, the flux maximizes in the inner RB, inside the L=2 shell, and drops precipitously at larger values of L. Furthermore, an examination of their temporal behavior indicates that the energetic proton flux in the inner RB is constant over times longer than tens to a hundred years. This is not the case for the outer RB, where the dynamic behavior is of the order of few hours. The dominant source of the trapped protons in the inner RB is due to what is known as Cosmic Ray Albedo Neutron Decay (CRAND). CRAND refers to trapping by the Earth's magnetic field of the protons produced by the decay of albedo neutrons, created by collisions of cosmic rays with atmospheric nuclei. The loss time is consistent with that given by Equation 1 and the data shown in FIGS. 5a and 5b. This loss time scale gives lifetimes in excess of thirty to fifty years for particles mirroring above thousand kilometer (km). The long lifetimes of the particles mirroring at high altitudes is related to the low density of the atomic nuclei and the low collisional pitch angle scattering into the loss cone. It is clear that increasing the rate of pitch angle of the protons trapped at high altitudes by artificial means will result in faster loss rate and lower trapped flux.

3. Radiation Belt Environment Following HANE

A particularly hazardous for the survival of space systems situation arises if a nuclear device is detonated above the atmosphere (i.e. above 100 km altitude). In this case a large number of energetic electrons (Energy>1 MeV) are injected into the radiation belts due to beta decay of the radioactive fragments. Depending on the L-shell, altitude, and yield of the device the beta decay electrons can stay trapped for weeks, months and even years, creating an enhanced radiation environment. In fact during the Starfish HANE in 1962 the relativistic electron flux increased by a factor of more than 100 over the natural one and stayed above its natural value for several years. As estimated by the Defense Threat Reduction Agency the flux of relativistic electrons increases by more than a factor of 1000 for a hypothetical 10 kT HANE at 150 km over Korea. The same analysis predicts that the number of functioning satellites at LEO will be reduced by more than an order of magnitude within a few weeks. The important aspect is the fact that the satellites will survive if the newly injected relativistic electrons were forced to precipitate on a time shorter than one to two weeks. The techniques for achieving this task known as RBR rely on injection of whistler waves with frequency of kHz, a frequency region that has serious efficiency problems. The current invention relies in achieving RBR by using the same ULF frequency waves that can be used for the protons and the system that addresses PRBR can be used for RBR. We refer to this function of the system as the Low Frequency RBR (LFRBR).

The LFRBR concept relies on the fact that for low frequency waves resonance with energetic electrons depends only on the wave-number $k_z$ of the injected waves and although the low frequency waves initially injected have much smaller $k_z$ values than required, the wave-number of the injected waves increases along their propagation path when they approach the cyclotron frequency of the dominant or minority ions ($O^+$, $He^+$, $H^+$).

4. Proton Radiation Belt Remediation (PRBR)

Figure 6:
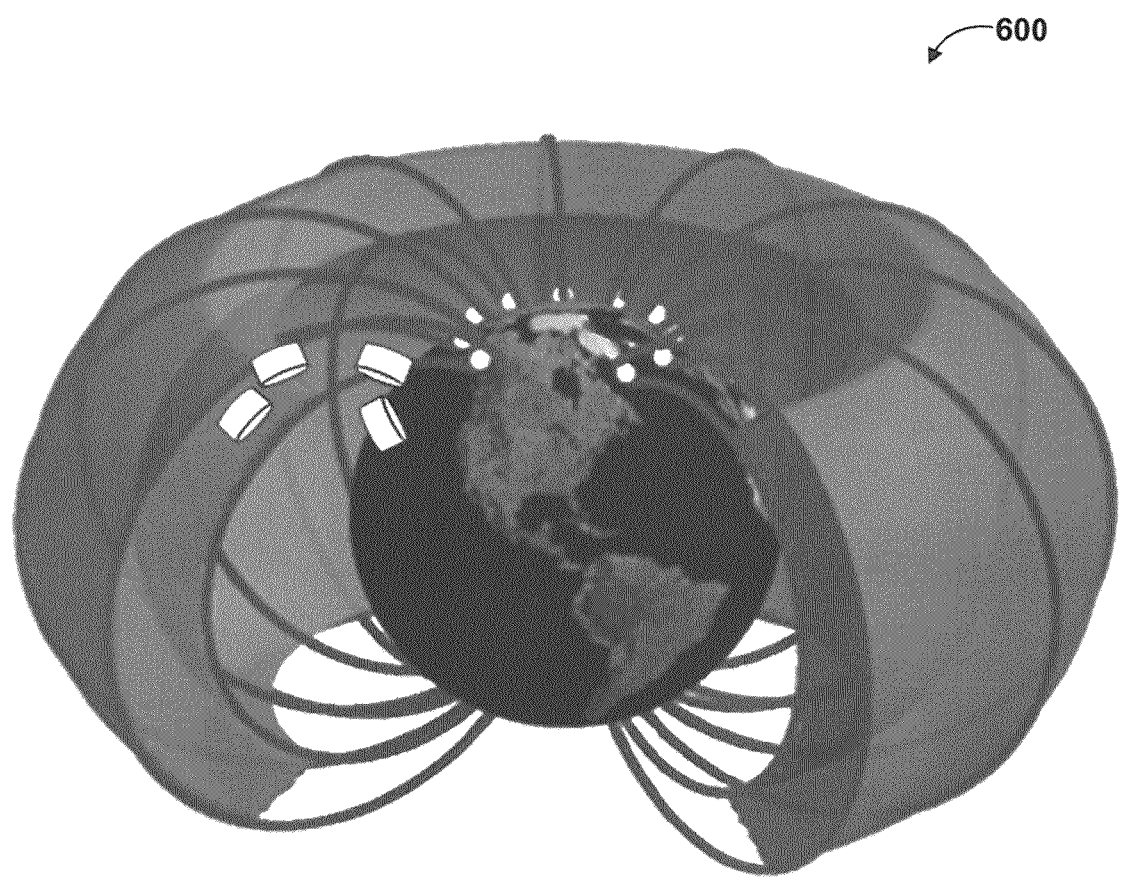
FIG. 6 illustrates a schematic drawing of the Proton Radiation Belt Remediation (PRBR) and the Low Frequency Radiation Belt Remediation (LFRBR) system, in accordance with the disclosed embodiments.

A schematic drawing of the Proton Radiation Belt Remediation (PRBR) system 600 is illustrated in FIG. 6. ULF waves are injected from the ground to fill and maintain Shear Alfven Waves (SAW) with the proper frequency ω and amplitude B in the region to be remediated. The energetic protons interacting with the SAW will pitch angle scatter and forced to precipitate in the atmosphere. Designing such a PRBR system 600 requires the physics input such as frequency selection, pitch angle scattering rate and proton lifetime and energy-power requirements.

4.1 Frequency Selection

Neglecting relativistic effects and concentrating on the primary resonance, energetic protons interact with SAW when the Doppler shifted wave frequency ω seen in the reference frame of the energetic proton is equal to its gyrofrequency Ω namely, $$\omega - k_z v_z = -\Omega \quad \text{Equation 2}$$

In Equation 2, $k_z$ is the wave-number in the magnetic field direction. Assuming ω<<Ω, and using the dispersion relation of SAW, with $V_A$ as the Alfven speed, as $$\omega = k_z V_A \quad \text{Equation 3}$$

The protons velocity v and pitch angle α, resonate with SAW when $$\omega(v, \alpha) = \frac{\Omega}{\cos\alpha} \frac{V_A}{v} \quad \text{Equation 4}$$

Figure 7:
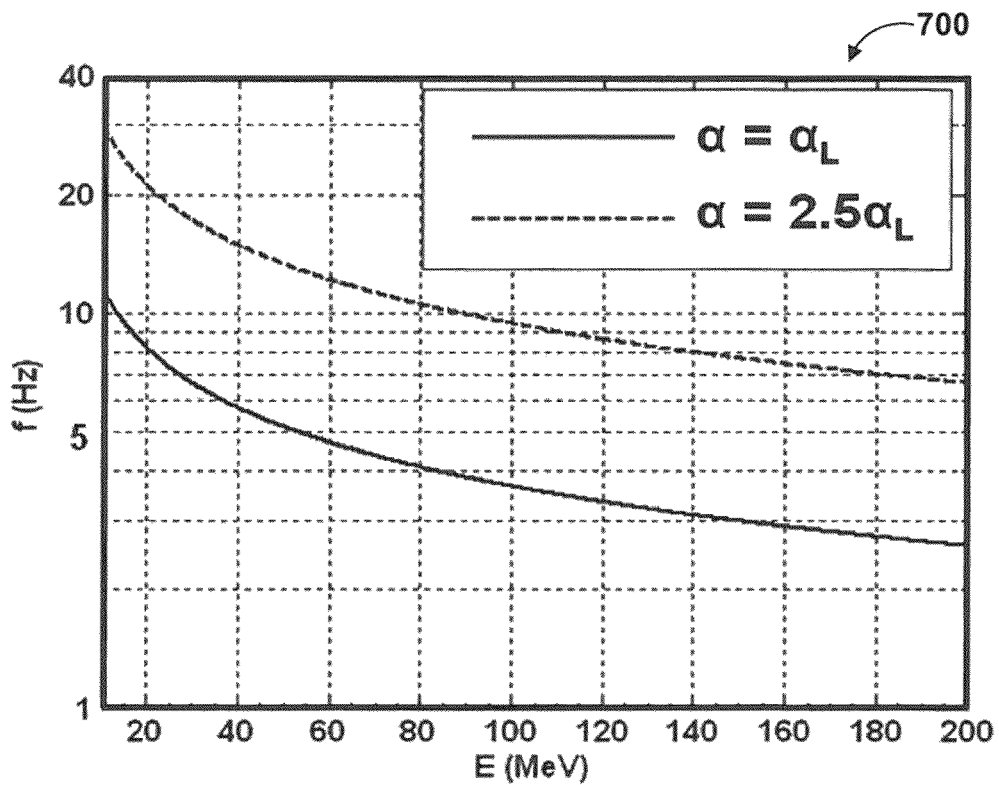
FIG. 7 illustrates a graph showing variation of minimum resonant SAW frequency and proton energy, under conditions typical of the magnetic equator of L=1.5, for two bounding pitch angles, in accordance with the disclosed embodiments.

Equation 4 can be re-defined to obtain the minimum frequency required to interact with protons outside the loss cone angle $\alpha_L$ of energy E, as $$\omega \geq \frac{\Omega}{\cos\alpha_L} \sqrt{\frac{MV_A^2}{2E}} \quad \text{Equation 5}$$

where M is the proton mass. FIG. 7 shows a graph 700 of the minimum frequency as a function of energy for typical equatorial plasma conditions at L=1.5. The pitch angle loss cone at L=1.5 is around 28 degree. One can see for example that SAW with frequency thirteen Hertz and bandwidth $2\delta\omega/\omega_0 \approx 1$ will resonate with thirty MeV at all angles inside the loss cone, as well as with higher energy trapped protons.

4.2. Pitch Angle Scattering Rate and Proton Lifetime

Computation of the scattering rate and proton lifetime in the presence of a given SAW spectrum requires a couple of relatively complex but otherwise standard computations. The first is to follow textbook procedure (Lyons and Williams, 1984) to calculate the pitch angle diffusion coefficient as a function of the SAW spectrum and amplitude for the energy range of interest. The second is to determine the effective diffusion coefficient by averaging over the bounce and azimuthal orbit. This gives the effective diffusion coefficient as a function of the SAW amplitude <δB>. It is important to emphasize that, this is the average amplitude that a proton sees when it completes its entire orbit. The results are the same, if the waves concentrated in a small azimuthal shell with higher amplitude or if the waves uniformly distribute over the azimuth. Finally the lifetime is computed as discussed in Lyons and Williams (1984), by solving the bounced averaged pitch angle diffusion equation as an eigen-value problem. The details of this analysis can be found in Shao et al. (2009).

TABLE 1

| E in MeV | f1 = 6.5 Hz | f2 = 10 Hz | f3 = 13 Hz |
|---|---|---|---|
| 30 | 1688 days | 880 days | 595 days |
| 50 | 900 days | 586 days | 920 days |
| 100 | 580 days | 1032 days | 1600 days |

Table 1 shows the proton lifetimes in the presence of SAW with average amplitude 25 pT for selected injection frequencies and proton energies. Notice that the diffusion rate as well as the lifetime scale as the square of the SAW amplitude.

4.3. Energy-Power Requirements

Two factors affect the energy-power required to accomplish a desirable remediation. The first is obviously the size of the region in units of δL. The second is the SAW confinement time that in its turn depends on the reflection coefficient R of the SAW from the ionosphere. The results per δL=0.1 is expressed as a function of the reflection coefficient R. Considering the region of L=1.5, the volume is given approximately by $3 \times 10^{20} (\delta L/0.1) m^3$. Therefore, to achieve the lifetimes referred to in Table 1 the volume should contain a total energy of 75 kJ in SAW.

Figure 9:
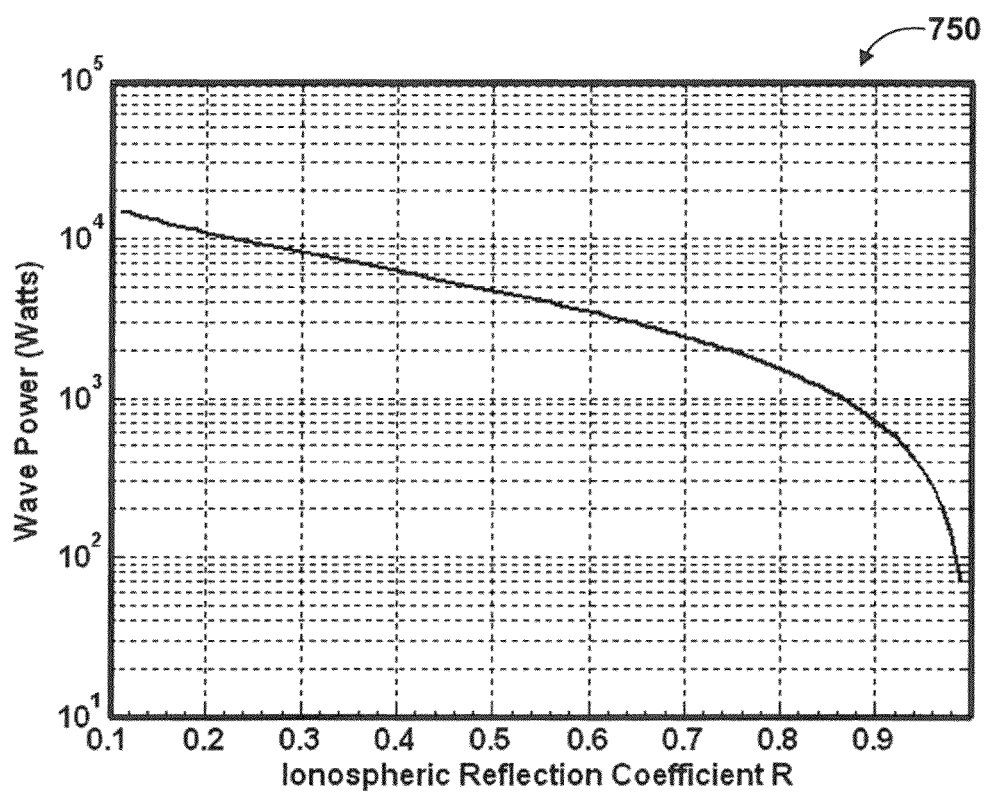
FIG. 9 illustrates a graph showing the dependence of injected wave power on ionospheric reflection coefficient R to maintain wave energy W=75 kJ inside the shell volume at L=1.5 with δL=0.1, in accordance with the disclosed embodiments.

When SAW trapping region is treated as a leaky cavity, then $$\frac{dW}{dt} = P - vW \qquad \text{Equation 6}$$

Where W is the SAW energy, P the injected power and v is the energy loss rate. The energy loss rate due to transmission at the ionospheric boundary is $v = -\ln R/T_o$, where R is the reflection coefficient at the ionospheric boundary and To is the Alfven wave transit time along the magnetic field line. FIG. 9 illustrates a graph 750 showing the power required to maintain SAW energy of 75 kJ as a function of the reflection coefficient. The power varies from a few hundred of watts to several kW.

5. Low Frequency Electron Radiation Belt Remediation (LFRBR)

The LFRBR system schematic is similar to the one shown in FIG. 6 for PRBR. The main difference is the frequency selection process. Energetic electrons interacting with ULF waves satisfy a resonance condition similar to that of Equation 2, but with $\Omega$ replaced by the relativistic electron frequency $\Omega_e/\gamma$, where $\gamma$ is the usual relativistic factor and $\Omega_e$ taken as positive. As a result the resonant condition becomes $$\omega - k_z v_z = -\Omega_e/\gamma \qquad \text{Equation 7}$$

For $\omega \ll \Omega_e$ the above equation becomes $$k_z = \Omega_e/\gamma v_z \qquad \text{Equation 8}$$

Figure 8:
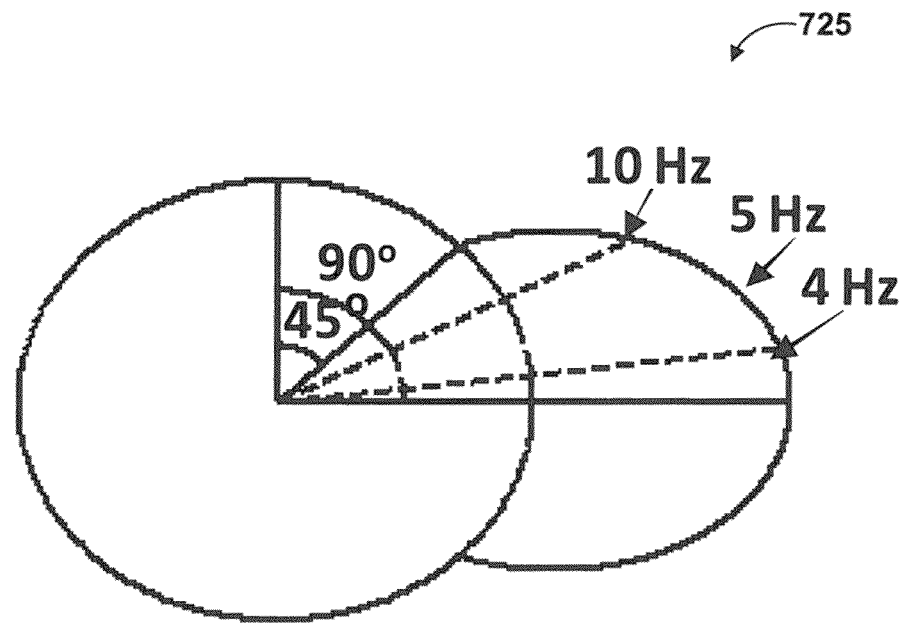
FIG. 8 illustrates the region of mode conversion of ULF waves to EMIC waves resonant with relativistic MeV electrons typical of L=2 conditions.

ULF waves injected as SAW satisfying Equation 3 do not satisfy the resonance condition of Equation 8 for relativistic MeV electrons when they are first injected near the bottom of the field line. However for waves with frequency dose to the ion cyclotron frequency of Oxygen or one the minority species at some point along their propagation path towards the conjugate $k_z$ changes and reaches a value that satisfies the resonance condition of Equation 8 for electrons with energies 1-2 MeV such as injected by a HANE. These waves are called Electro-Magnetic Ion Cyclotron (EMIC) waves. FIG. 8 illustrate a graph 725 showing the location at which injected frequencies at the bottom of the field line become EMIC waves based on the ion cyclotron frequency of Oxygen for typical conditions of the gap at L=2. By chirping the injected frequency between 4 Hz and 10 Hz a region of approximately 3 Mm of EMIC waves in resonance with 1-2 MeV electrons can be establishes such as injected following a HANE.

6. Apparatus for Accomplishing PRBR and LFRBR

The basic PRBR and LFRBR system 600 concept illustrated in FIG. 6. SAW can be generated either from ground transmitters and injected upwards along magnetic field lines or injected directly from space based platforms. The SAW in the chosen frequency range interact resonantly with 10 to 100 MeV protons causing to precipitate at a rate that depends on the amplitude of the SAW. For amplitude of the order of 25 to 30 pT, the proton flux can be reduced by one order of magnitude, or more on times, one to three years. Under similar conditions the relativistic MeV electron lifetime injected by HANE will be of the order of weeks.

6.1. Steady State Horizontal Electric Dipole (HED) Transmitters

HED system is similar to traditional ELF transmitters that are used for submarine communications such as the FELF system located in Michigan. Greifinger examined a similar system for lateral injection of ULF signals in the Earth-ionosphere or the Alfvenic waveguide. FIG. 10a illustrates an apparatus 800 for injecting SAW to the ionosphere using Horizontal Electric Dipole (HED) and FIG. 10b illustrates an apparatus 850 for injecting SAW to the ionosphere using Rotating Magnetic Field (RMF) antennas.

In HED system, antenna can be utilized to inject SAW upwards through the lower ionosphere along the magnetic field lines as illustrated in FIG. 10a. The electric and magnetic fields of such an antenna will depend on the current I, the horizontal length L and the skin depth δ of the ground through which the return current flows. It is easy to calculate the magnetic field at altitude 75 km, the bottom of the magnetized ionosphere and given by $$H_y \approx \frac{IL}{4\pi h^2}(\delta/h),\ E_x \approx Z(h)\frac{IL}{4\pi h^2}(\delta/h), \qquad \text{Equation 9}$$

$$Z(h) = \sqrt{\frac{i\omega\mu}{\sigma_P(h) + i\omega\varepsilon}}. \qquad \text{Equation 10}$$

Z(h) is the impedance at the bottom of the ionosphere and $\sigma_P(h)$ is the corresponding Pedersen conductivity. Note that the electric and magnetic fields are driven by two anti-parallel currents such as antenna current and image current, separated by the skin depth distance δ, assuming δ≪L. From Equations 9 and 10, the power density injected in the ionosphere by a HED with dipole moment IL at a frequency f is thus given by $$S = Z_0(1/\sqrt{1 + \rho_P(h)/i\omega\varepsilon})(IL/4\pi h^2)^2(\delta/h)^2 \qquad \text{Equation 11}$$

Where $Z_0 = 120\pi$ is the impedance of free space. Taking the approximate area at an altitude h as $h^2$, the injected power in the RB in practical units will be given by $$P(z=h) \approx \alpha 4(IL/3 \times 10^4\ A\text{-}km)^2(75\ km/h)^4(\delta/7\ km)^2\ kW \qquad \text{Equation 12}$$

In Equation 12 $\alpha \approx \cos^2\theta \sqrt{\varepsilon\omega/\rho_P(h)}$ is the efficiency with which the power at the bottom of the ionosphere will couple to the SAW, if the angle that the Earth's magnetic field makes to the ground at the transmitter location is θ. Based on the fact that the ionospheric attenuation at few Hz frequencies is negligible and using nighttime conditions, the factor α is of order unity. As a zero order estimate, a HED with L≈10 to 15 km, and I=1 to 3 kA located on ground with conductivity approximately $10^{-4}$ S/m could in principle inject a few kW of power into the SAW mode required to achieve lifetime of the order of 2 to 3 years for 30 to 100 MeV trapped protons. In such a system the main loss is ohmic heating of the ground and overall efficiencies of the order or better than $10^{-3}$ can be achieved. The total ground power required is of the order of few MW.

6. Rotating Magnetic Field (RMF)

An alternative system 850 that can inject SAW efficiently in the radiation belts is illustrated in FIG. 10b. The system 850 utilizes an array of superconducting coils (permanent magnets) with magnetic moment parallel to the ground and rotating at the relevant frequency $\omega=2\pi 7f$. Note that in contrary to the HED, the image source of a Horizontal Magnetic Dipole is in the same direction, thereby doubling the strength of the source. The magnetic field at the bottom of the ionosphere of such a Rotating Magnetic Field (RMF) source will be given approximately by $$\overline{H}(z \approx h) \approx \frac{M(\hat{e}_x \cos\omega t + \hat{e}_y \sin\omega t)}{\pi h^3},$$

$$\overline{E}(z=h) \approx Z(h)\frac{M(\hat{e}_y \cos\omega t + \hat{e}_x \sin\omega t)}{\pi h^3}.$$

Equation 13

In practical units the power injected in SAW will be approximately $$P \approx \alpha 64 (75 \text{ km}/h)^2 (M/2 \times 10^4 \text{ A-km}^2)^2 \text{ kW}$$

Equation 14

An advantage of the RMF system is its compactness and portability. For example, a superconducting magnet with 25 m$^2$ area. Four hundred Ampere DC current and $10^5$ turns has an approximate magnetic moment of $10^9$ A-m$^2$. Approximately twenty coils will be needed to get inject kilowatt level power. A further advantage of such a system is that it does not require low conductivity ground and can thus be located in any desirable location as well as it can be portable. For example it can be located in a barge or any platform such as of rig platforms.

6.3. Transient Horizontal Electric Dipole (THED) Transmitters

Figure 11:
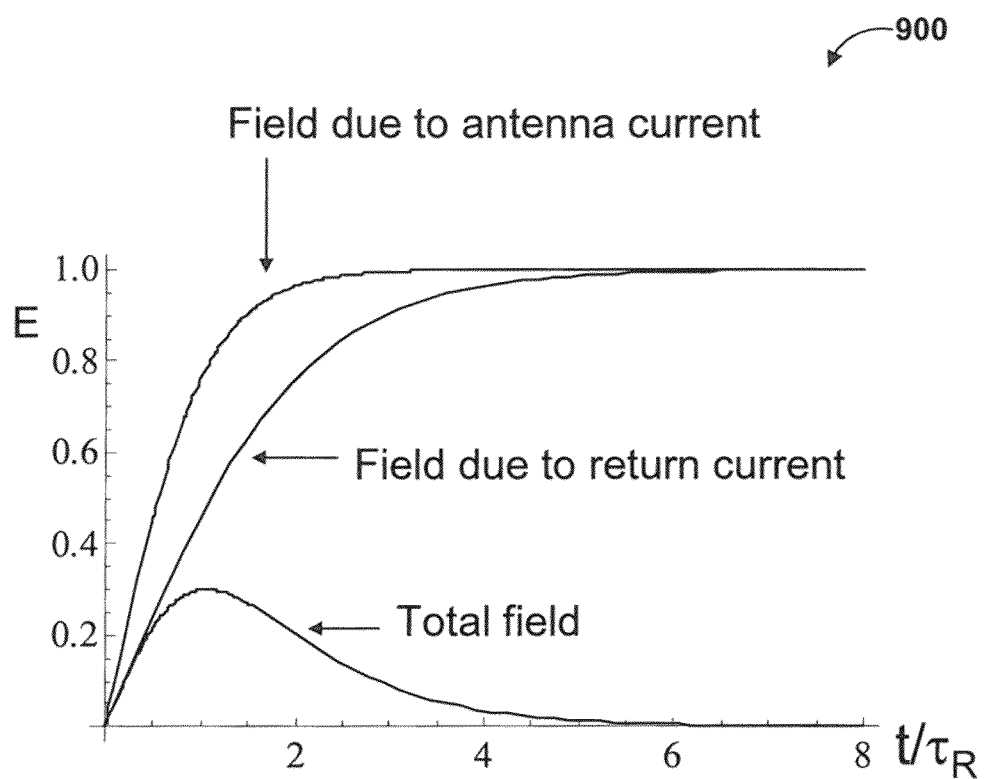
FIG. 11 illustrates a graph of amplitude of the electric field in the ionosphere versus time, showing a sneak-through concept of Transient Horizontal Electric Dipole (THED) Transmitters, in accordance with the disclosed embodiments.

THED systems which are similar to HED systems operate in transient mode with pulse length of the order of 0.1 to 1 seconds and can inject broadband waves in the desired frequency band. A significant advantage of such a system is that it can increase the injection efficiency of the steady state HED by as much as 20 dB by avoiding the effect of the magnetic field generated by the ground return current at the bottom of the ionosphere. This is accomplished by an innovative "sneak-through" operation part of the present invention. FIG. 11 illustrates, a graph 900 of amplitude of the electric field in the ionosphere versus time, showing a sneak-through concept of Transient Horizontal Electric Dipole (THED) Transmitters. The sneak-through concept relies on the fact that, in order to reach the bottom of the ionosphere, the magnetic field generated by the return current has to travel through the conducting ground first, before moving at the speed of light to the bottom of the ionosphere, while the magnetic field of the antenna travels only through vacuum. Since the wave propagation through the ground is controlled by diffusive processes and by more than four orders of magnitude slower than the speed of light. As a result, operating on a transient mode allows the antenna signal to inject SAW before the ground signal reduces its amplitude.

FIG. 12a illustrates a graph 910 showing the ground response time as a function of antenna length and ground conductivity, similar to the L/R time of a circuit. Timescales of 0.1 to 1 seconds can be accomplished by a combination of antenna lengths in the few hundred meters for a range of ground conductivities. FIG. 12b and FIG. 12c illustrate graphs 920 and 930, showing relative efficiency as compared to a HED without reduction by ground return effects for rise times of T/3 and T respectively. The relative efficiency of pulses with rise time T/3 and T as compared to the value expected by an antenna without effects due to the ground return are shown. In this case the power density is given by $$S=Z_0(1/\sqrt{1+\sigma_P(h)/i\omega \in})(IL/4\pi h^2)^2$$

Equation 15

This is similar to Equation 11 but with the value of $\delta/h=1$. This factor reduces the efficiency of the steady state HED by more than 15 to 20 dB. As seen in from FIGS. 12b and 12c, the reduction due to the ground return in the THED case is less than one dB.

FIG. 13 illustrates a flow chart 950 for improving the survivability of space systems following a High Altitude Nuclear Explosion (HANE) incident resulting in energetic electrons being trapped in the inner radiation belt of Earth, in accordance with the disclosed embodiments. As illustrated at block 952, the electromagnetic waves are generated using at least one transmitter. Then as said at block 954, the generated electromagnetic waves are injected into Earth ionosphere. The frequency range of injected electromagnetic waves are then selected either from ground or space in order to ensure electromagnetic waves are in gyro frequency resonance with trapped energetic particles as depicted at blocks 956 and 958. Pitch angle scattering of the trapped protons in gyro-resonance with the injected waves increases their precipitation rate by forcing their orbits into pitch angles inside the atmospheric loss-cone and are lost by interacting with the dense neutral atmosphere at altitudes below 100 km. Thus, the energetic particle fluxes trapped in the inner radiation belt and gap are reduced by injecting Ultra-Low Frequency (ULF) electromagnetic waves.

It will be appreciated that variations of the above disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for improving the survivability of space systems following a High Altitude Nuclear Explosion (HANE) incident resulting in energetic electrons being trapped in the inner radiation belt of Earth comprising the steps of:
   generating electromagnetic waves using at least one transmitter;
   injecting said electromagnetic waves to Earth's radiation belts;
   selecting frequency range of said electromagnetic waves;
   ensuring said electromagnetic waves in gyro frequency resonance with trapped protons of energy between 10 and 100 Mev and relativistic electrons with MeV energy, wherein Radiation Belt Remediation (RBR) depends on the wave-number $K_z$ of the injected waves.

2. The method of claim 1 wherein said electromagnetic waves comprise Ultra-Low Frequency (ULF) electromagnetic waves.

3. The method of claim 2 wherein the wave-number of the injected waves increases along their propagation path when they approach the cyclotron frequency of the dominant or minority ions.

4. The method of claim 3 wherein the dominant or minority ions are $0^+$, $He^+$ and $H^+$.

5. The method of claim 2 wherein energetic electrons satisfy a resonant condition which becomes $$\omega - k_z v_z = -\Omega_e/\gamma \qquad \text{Equation 7.}$$

6. The method of claim 2 wherein
For $\omega \ll \Omega_e$ so that the resonant condition becomes $$k_z = \Omega_e/\gamma v_z \qquad \text{Equation 8.}$$

7. A method for improving the survivability of space systems following a High Altitude Nuclear Explosion (HANE) incident resulting in energetic electrons being trapped in the inner radiation belt of Earth comprising the steps of:
  generating electromagnetic waves comprising Ultra-Low Frequency (ULF) electromagnetic waves using at least one transmitter;
  injecting said electromagnetic waves to Earth's radiation belts;
  selecting frequency range of said electromagnetic waves;
  ensuring said electromagnetic waves in gyro frequency resonance with trapped protons of energy between 10 and 100 Mev and relativistic electrons with MeV energy, wherein Radiation Belt Remediation (RBR) depends on the wave-number $K_z$ of the injected waves, and the wave-number of the injected waves increases along their propagation path when they approach the cyclotron frequency of the dominant or minority ions.

8. The method of claim 7 wherein the dominant or minority ions are $O^+$, $He^+$ and $H^+$.

9. The method of claim 7 wherein energetic electrons satisfy a resonant condition which becomes $$\omega - k_z v_z = -\Omega_e/\gamma \qquad \text{Equation 7.}$$

10. The method of claim 7 wherein
For $\omega \ll \Omega_e$ so that the resonant condition becomes $$k_z = \{\text{fourth root}\}_e/\gamma v_z \qquad \text{Equation 8.}$$

* * * * *